United States Patent
Kerler et al.

(10) Patent No.: US 9,216,758 B2
(45) Date of Patent: Dec. 22, 2015

(54) STEERING AND BRAKE ARRANGEMENT

(71) Applicant: AGCO International GmbH, Hesston, KS (US)

(72) Inventors: Herbert Kerler, Marktoberdorf (DE); Klaus Brugger, Marktoberdorf (DE)

(73) Assignee: AGCO International GmbH, Neuhausen (CH)

( * ) Notice: Subject to any disclaimer, the term of this patent is extended or adjusted under 35 U.S.C. 154(b) by 0 days.

(21) Appl. No.: 14/581,137

(22) Filed: Dec. 23, 2014

(65) Prior Publication Data
US 2015/0203144 A1 Jul. 23, 2015

(30) Foreign Application Priority Data

Dec. 23, 2013 (GB) .................................... 1322900

(51) Int. Cl.
*B62D 1/16* (2006.01)
*B60T 11/21* (2006.01)
*B60T 7/06* (2006.01)

(52) U.S. Cl.
CPC ... *B62D 1/16* (2013.01); *B60T 7/06* (2013.01); *B60T 11/21* (2013.01)

(58) Field of Classification Search
CPC .............. B62D 1/16; B60T 11/21; B60T 7/06
See application file for complete search history.

(56) References Cited

U.S. PATENT DOCUMENTS

| 5,802,853 | A  | * | 9/1998 | Oberst et al. ..................... 60/581 |
| 6,929,104 | B2 | * | 8/2005 | Thomas ......................... 188/345 |
| 2014/0096635 | A1 | * | 4/2014 | Brugger et al. ................. 74/481 |
| 2014/0131131 | A1 | * | 5/2014 | Marois et al. ................. 180/316 |

FOREIGN PATENT DOCUMENTS

| GB | 1065316 A |   | 4/1967 |
| GB | 2466066 A | * | 6/2010 |
| WO | 2012/163718 A |   | 12/2012 |

OTHER PUBLICATIONS

Intellectual Property Office, Search Report dated Aug. 11, 2014 for UK Application No. GB1322900.0.

* cited by examiner

*Primary Examiner* — Ruth Ilan
*Assistant Examiner* — Darlene P Condra

(57) ABSTRACT

A brake and steering arrangement on a tractor comprising a substantially vertically extending structural support column for connection at a lower end to a floor of a tractor cab and carrying means to support a steering wheel at its upper end. A single cylinder is supported within the column. A first braking circuit operates left and right rear brakes and a second braking circuit operates a cardan brake, characterized in that braking circuits are connected to a single cylinder mounted on the steering column in the tractor cab and wherein said steering column comprises a valve unit, so that the brakes are operable by two pedals.

13 Claims, 9 Drawing Sheets

STEERING AND BRAKE ARRANGEMENT

BACKGROUND OF THE INVENTION

1. Field of Invention

This invention relates to steering and brake arrangements for vehicles such as tractors. More specifically, this invention relates to a steering and brake arrangement which comprises a steering column support structure which carries a steering wheel of the vehicle, two brake pedals and one master cylinder for operating a cardan brake or front axle brakes, a left rear brake and a right rear brake of the vehicle.

2. Description of Related Art

In modern tractors space is at a premium and therefore there is a requirement to provide a compact steering wheel and brake pedal support arrangement which can be located conveniently in the tractor cab for the vehicle operator.

The use of a compact steering and brake arrangement is also important on tractors where the driving seat can rotate through 180 degrees to a reverse driving position in order to provide good clearance for the rotation of the seat.

UK patent application No. 1109306.9 discloses a steering and brake arrangement for two steering brakes. This application discloses a single circuit brake arrangement. For two steering brakes, two master cylinders are needed to control either a left or a right wheel rear brake The left and right rear wheels of modern tractors are usually provided with separate left and right brakes which are activated by the operator by respective foot pedals to assist with steering. The tractor is further provided with a cardan brake which is activated together with both left and right brakes when both foot pedals are depressed together.

DE9204417 discloses a hydraulic brake arrangement in which two foot pedals are connected to two separate rear brakes and a front axle brake. The front axle brake is connected by a switch valve to both foot pedals which in turn operates two respective hydraulics. The switch valve activates when sufficient pressure is applied, that is when both cylinders are depressed. When one cylinder is depressed there is not enough pressure to enable the front brake to be activated and as a result only one of the rear brakes is activated.

However, switch valves suffer from wear and tear and may start to open under lower pressures, that is when only one foot pedal is depressed. This can lead to safety issues as a non reliable front brake may work in addition to a rear brake when it is not meant to. For example, the operator may only wish to apply one rear brake to steer around a corner, but if the front brake is also inadvertently applied there may be consequences if travelling at speed

OVERVIEW OF THE INVENTION

It is an aim of the present invention to provide a steering and brake arrangement tractor which is both compact in the tractor cab and which provides a reliable and safe brake arrangement for operating separate left and right rear brakes and a cardan brake or front axle brakes.

According to the invention there is provided a brake and steering arrangement on a tractor comprising a substantially vertically extending structural support column for connection at a lower end to a floor of a tractor cab and carrying means to support a steering wheel at its upper end, a single cylinder supported within the column, a first braking circuit for operating left and right rear brakes and a second braking circuit for operating a cardan brake, characterised in that braking circuits are connected to the single cylinder mounted on the steering column in the tractor cab and wherein said steering column comprises a valve unit, so that the brakes are operable by two pedals.

With the present invention only one cylinder is required for a dual circuit brake, one circuit for operating a cardan brake and another other circuit for operating two steering brakes.

Preferably, the valve unit comprises a first and second brake valve connected in series to the cylinder, one of said valves being operable by one pedal and the other of said valves operable by the other pedal and wherein said valves are connected in series with the cardan brake.

The valve unit preferably comprises a left brake valve and a right brake valve for activating left and right rear brakes respectively in the first circuit, said left brake valve operable by one pedal and said right brake valve operable by the other pedal.

The first brake valve and the left brake valve are preferably activated by one pedal and the second brake valve and the right brake valve are activated by the other pedal. The left and right brake valves are connected to associated left and right brake valves respectively for controlling fluid supply to the left and right brakes respectively.

Preferably, the first and second brake valves are connected in series with an associated cardan brake valve for controlling fluid supply to the cardan brake. Activation of either the left pedal or the right pedal preferably opens the first brake valve and the left brake valve, or the second brake valve and the right brake valve and movement of the left and right pedal together opens the first brake valve, the second brake valve, the left brake valve and the right brake valve.

The cylinder preferably comprises an operating rod and a piston which is moveable substantially vertically by movement of each pedal, or by movement of both pedals together. The cylinder may be a pneumatic or a hydraulic cylinder. The cylinder is connected to the fluid supply by two control valves. The fluid supply preferably comprises two separate fluid supplies, a first fluid supply for the first circuit and a second fluid supply for the second circuit.

The valve unit is connected to a bearing of the steering column by welding. The first and second brake valves and the left and right brake valves are preferably connected to the valve unit by hollow screws. With the present invention only one cylinder is required for a dual circuit brake, one circuit for operating a cardan brake and another other circuit for operating two steering brakes.

BRIEF DESCRIPTION OF THE DRAWINGS

The present invention will now be described, by way of example only, with reference to the accompanying drawings in which.

DETAILED DESCRIPTION OF EXEMPLARY EMBODIMENTS

Figure 1:
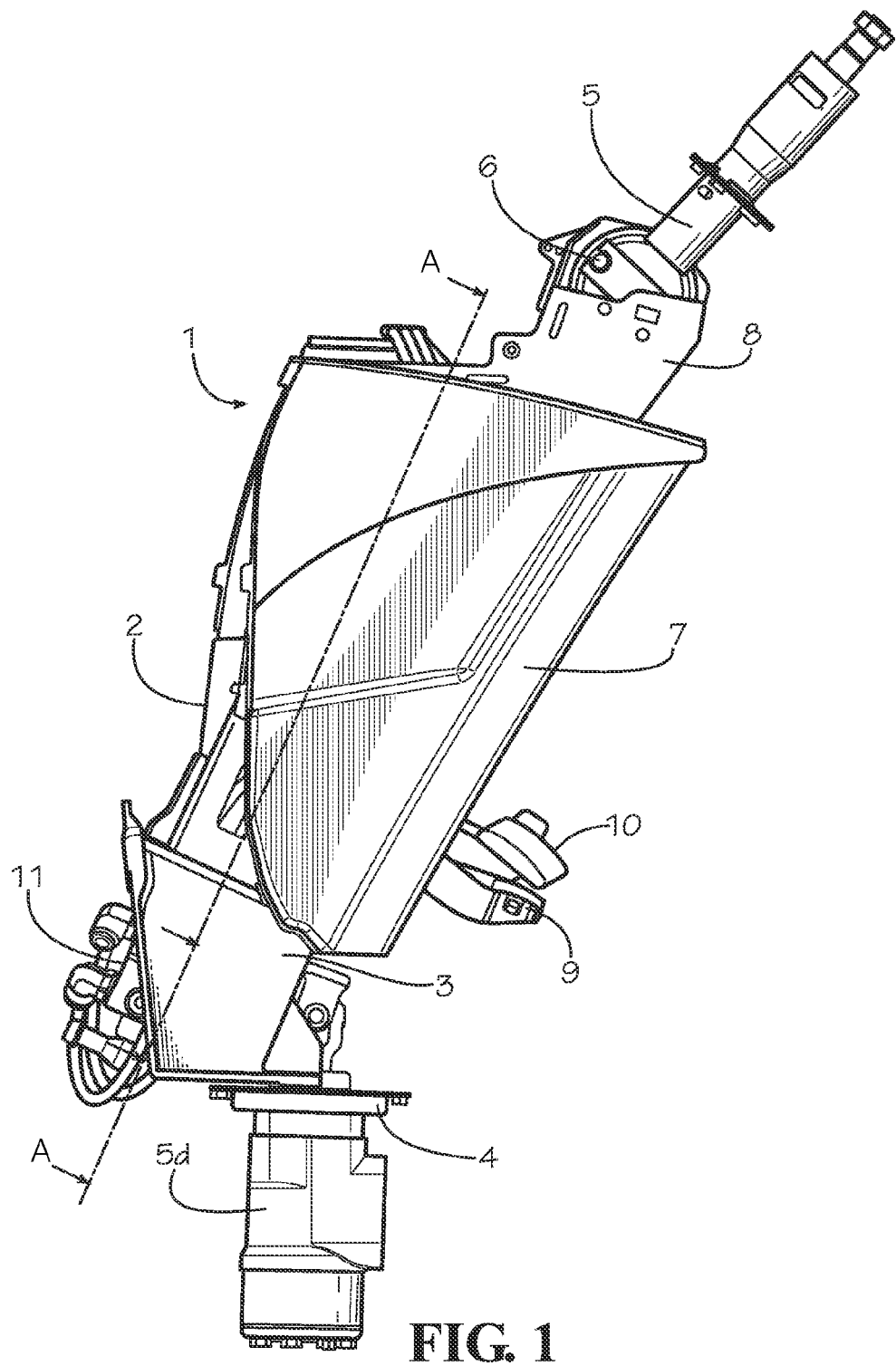
FIG. 1 shows a side view of a steering and brake arrangement in accordance with the present invention.
Figure 2:
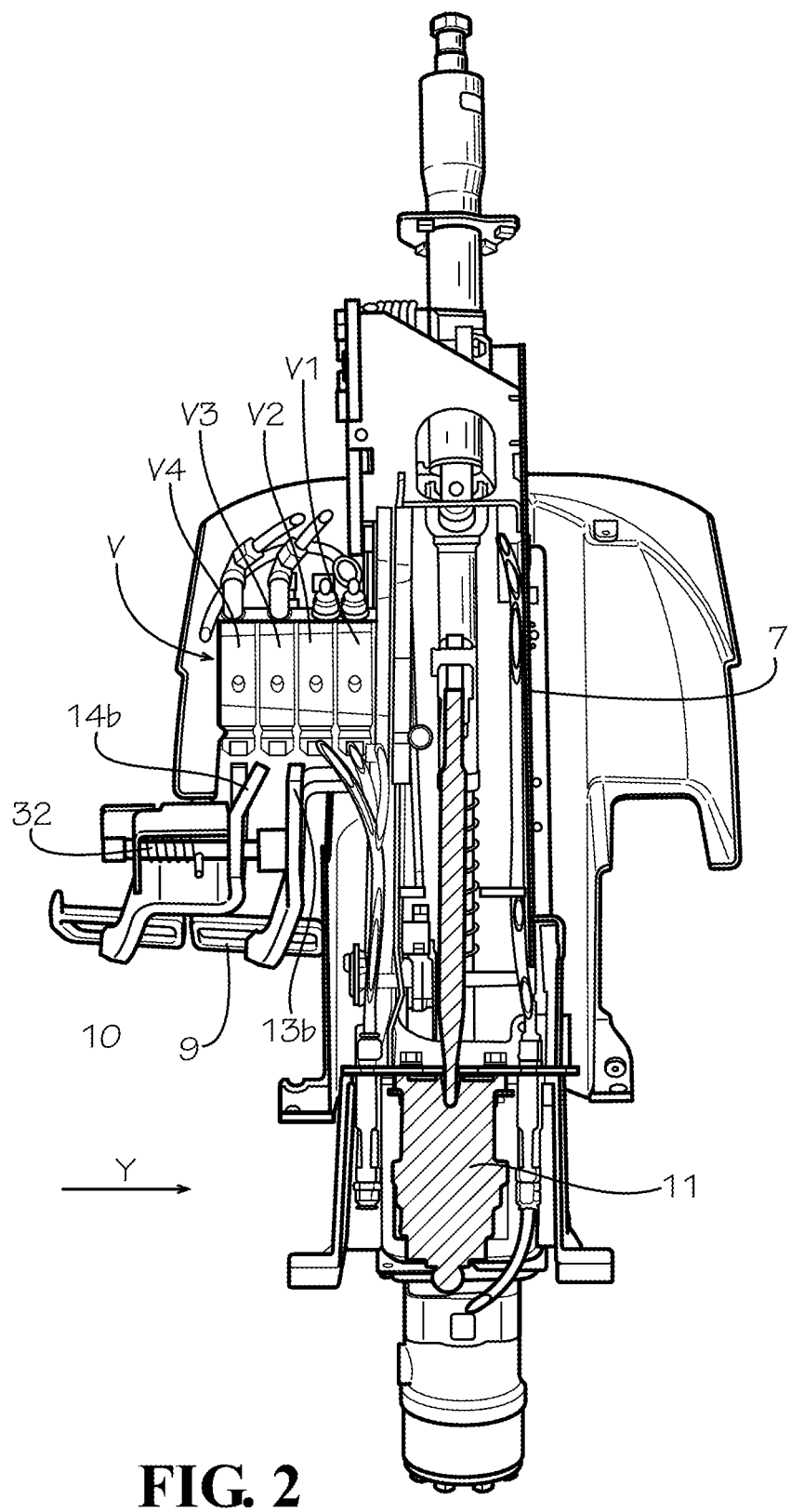
FIG. 2 shows a section on the line A-A of FIG. 1.
Figure 3:
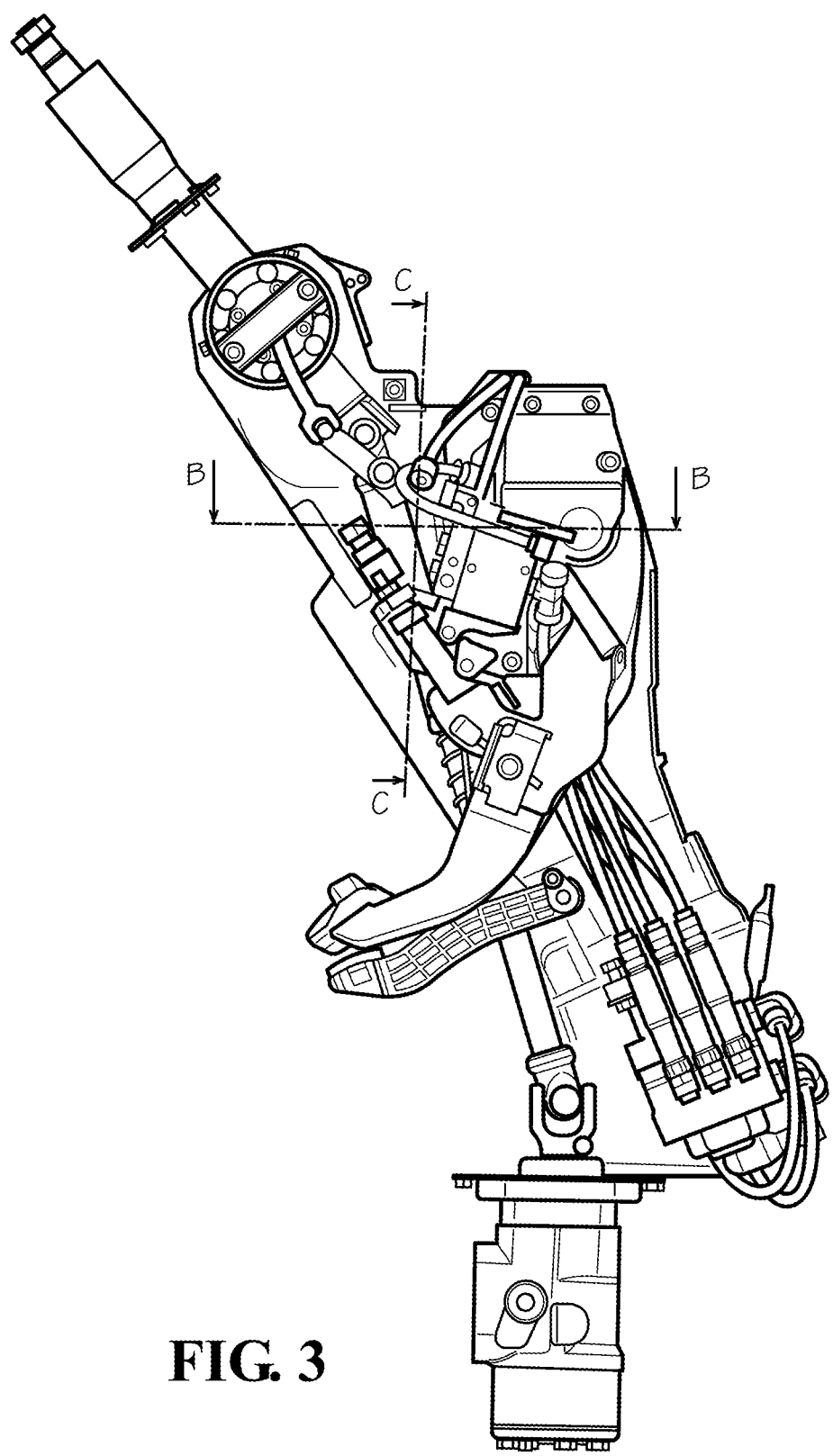
FIG. 3 shows a view in the direction of arrow Y of FIG. 2 with part of the structure removed for clarity and one of the pedals depressed.
Figure 4:
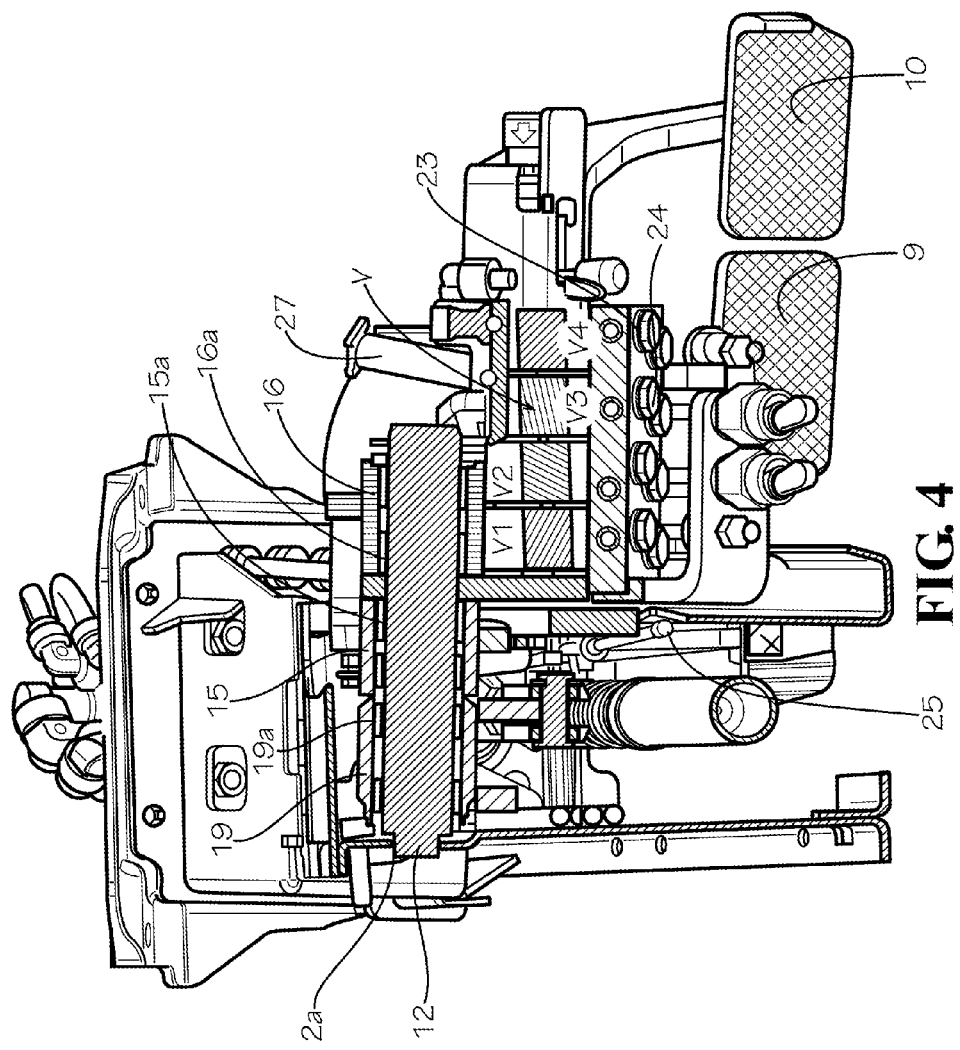
FIG. 4 shows a section on the line B-B of FIG. 3, FIGS. 5 and 5a show a section on line C-C of FIG. 3.

Referring to the drawings, a steering and brake arrangement 1 for operating a dual circuit brake comprises a substantially vertically extending structural support column 2 for connection at a lower end 3 to a cab floor 4. The support column 2 mounts a steering column 5 which carries at its upper end a steering wheel. The steering column has a pivotal connection 6 which allows the angle of inclination of the steering wheel to be adjusted in a known manner. The steering column 5 is connected to the steering valve unit 5*d*. Steering valve unit 5*d* is positioned under cab floor 4.

The structural support column 2 comprises the lower part 3, a central portion 7 and an upper portion 8 which supports the pivotal connection 6.

Figure 5:
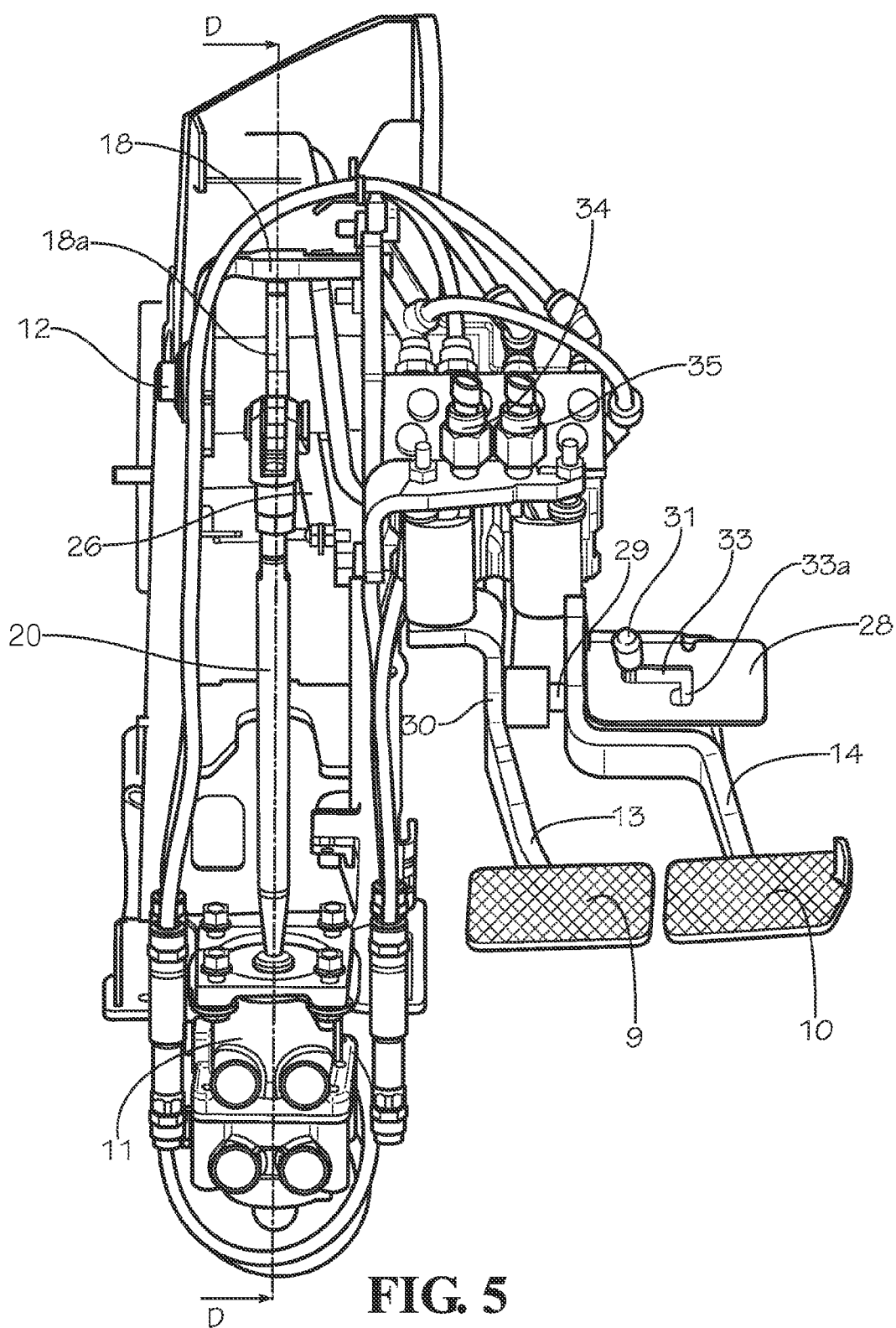
Figure 5A:
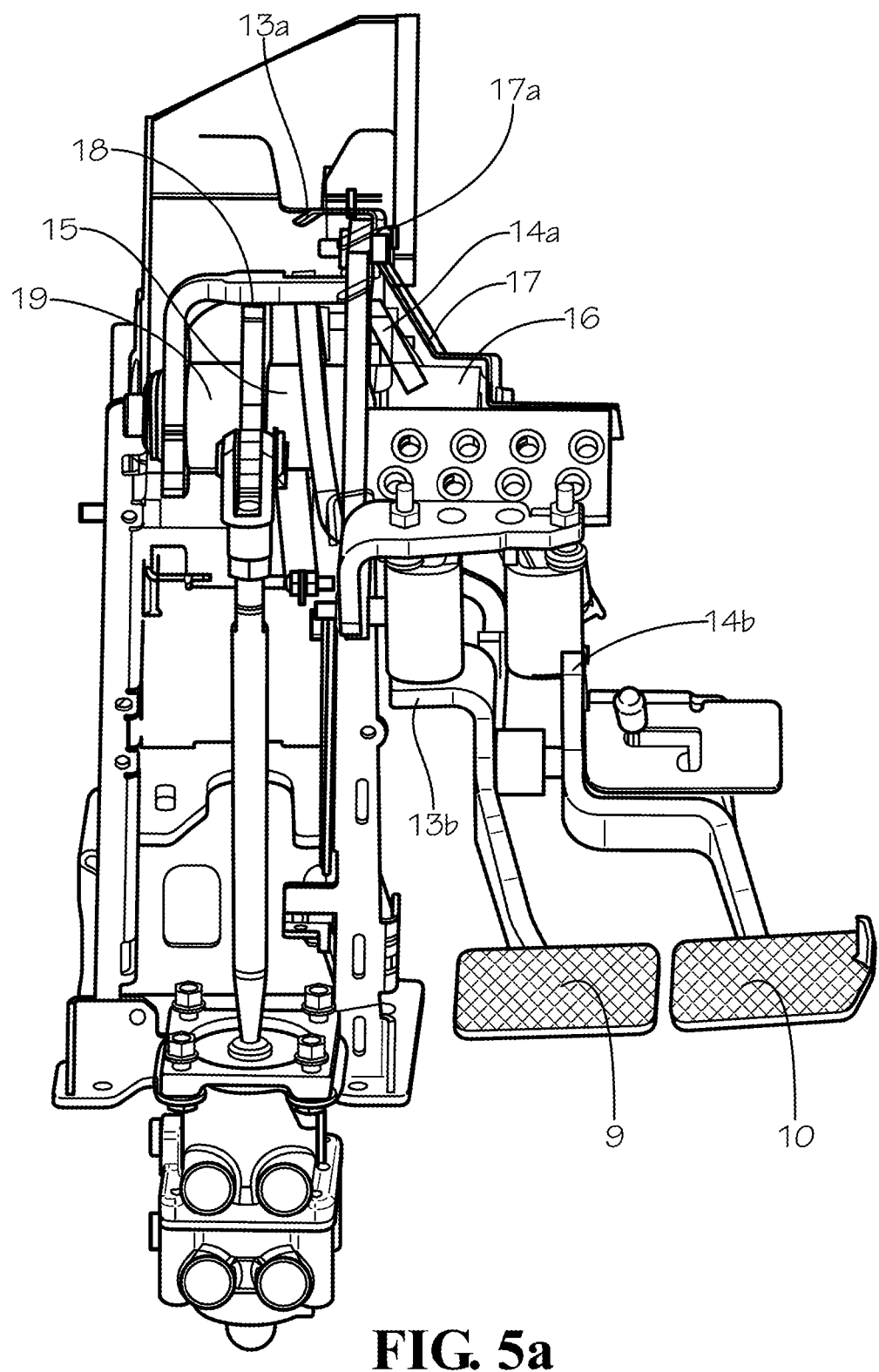

In accordance with the present invention, a pair of brake pedals 9 and 10 are mounted on the side of the support column 2 and are positioned to the right of this column as viewed from the tractor operator's seat as shown in FIG. 5 which when pressed activate a master pneumatic cylinder 11 for controlling the flow of air to different valves V1, V2, V3 and V4 of a valve arrangement V for operating brakes of the tractor.

Brake pedals 9 and 10 are pivotally mounted on and within the support column 2 via a pivot pin 12. Each pedal 9 and 10 is mounted on the lower end of an associated pedal arm 13 and 14 having an upper end 13*a* and 14*a* and a middle part 13*b* and 14*b* respectively. Each upper end 13*a* and 14*a* being mounted on a respective pivot sleeve 15 and 16 which encircles pivot pin 12 and is mounted thereon via bearings 15*a* and 16*a* respectively. Pivot pin 12 is inserted into a bore 2*a* of the steering column and is attached to a plate 17 which allows the pin to be secured to the support column 2 by a bolt 17*a* to prevent movement of the pin relative to the column when the brake pedals 9 and 10 are in use.

The upper portion 13*a* and 14*a* of each brake pedal arm are connected to a lever 18. The lever 18 is mounted on a pivot sleeve 19 which encircles pivot pin 12 and is mounted thereon via bearings 19*a*. The lever 18 is connected to a push rod 20 via lever arm 18*a*. The push rod 20 is connected to the master cylinder 11. The master cylinder 11 is bolted to a bulk head 22 which constitutes the lower end of the central portion 7 of the support column 2. The cylinder 11 projects within the lower end 3 of the support column 2 which is secured to the cab floor 4. The cylinder has an internal piston (not shown) which is moved substantially vertically by an associated operating rod.

The cylinder 11 is operated by either the left pedal 9 or the right pedal 10 or by both together. Thereby the cylinder 11 controls pressure. When activated fluid flows to the valve arrangement. The brake circuit may be more easily followed by looking at the schematics of FIGS. 7 and 8.

The middle parts 13*b* and 14*b* of pedal arms 13, 14 respectively are connected to valves V1, V2, V3 and V4 of the valve arrangement V. First brake valve V1 and left brake valve V2 are connected to part 13*b*. Second brake valve V4 and right brake valve V3 are connected to part 14*b*. Normally the valves V1, V2, V3 and V4 are in a closed position and are operable if the associated middle part 13*b*, 14*b* is moved by the associated brake pedal 9,10. The first and second brake valves V1 and V4 are in series. First brake valve V1 is operable by brake pedal 9 and the second brake valve V4 is operable by brake pedal 10. Movement of both pedals together 9, 10 activates the cardan brake (see FIGS. 7 and 8). Left brake valve V2 is associated with the left wheel rear brake 36L and is operable by the left pedal 9 and right brake valve V3 is associated with the right wheel rear brake 36R and is operable by the right pedal 10.

Valves V1, V2, V3 and V4 are connected to a valve plate 23 by hollow screws 24 through which fluid can flow. The valve plate 23 is connected to a mount 25 by welding or screws.

Each brake pedal arm 13, 14 has a respective return spring 26, 27 connected thereto. The other end of each spring is connected to the support column 2.

Thus if, for example, the right pedal 10 is pressed pedal arm 14 is pivoted about pin 12 which in turn pushes down the push rod 20 via lever 18 to move the operating rod, which in turn displaces the piston within the master cylinder 11 to guide fluid to the valves V1, V2, V3 and V4. At the same time the middle part 14*b* activates right brake valve V3 and second brake valve V4 which then activates the right wheel rear brake 36R of the tractor. The cardan brake 39 is not operated if either first brake valve V1 or second brake valve V4 is not activated.

Similarly, if the left pedal 9 is depressed associated arm 13 is pivoted about pin 12 which in turn pushes down the push rod 20 via the lever 18 to move the operating rod, which in turn displaces the piston within the master cylinder 11 to guide fluid to the valves V1, V2, V3 and V4. At the same time the middle part 13*b* activates first brake valve V1 and left brake valve V2 which then activates the left wheel rear brake 36L of the tractor. The cardan brake is not operated unless the first brake valve V1 and second brake valve V4 are open. So again when only one pedal 9 is moved, only first brake valve V1 is activated and cardan brake 39 is not activated.

If both brake pedal 9 and 10 are pressed both pedal arm 13, 14 pivots about pin 12 which in turn pushes down the push rod 20 via lever 18 to move the operating rod, which in turn displaces the piston within the master cylinder 11 to guide fluid to the valves V1, V2, V3 and V4. At the same time the middle parts 13*b* and 14*b* activate valves V1, V2, V3 and V4 which then activates the left and right wheel rear brakes 36L, 36R and the cardan brake 39.

As is conventional in tractors, in order for the tractor to be driven safely on the road, the two brake pedals 9 and 10 are locked together by a locking mechanism 28 which comprises a spring loaded bolt 29 carried by pedal arm 14 which, when in the position shown in FIG. 5, engages an aperture 30 provided in brake pedal arm 13.

Figure 6:
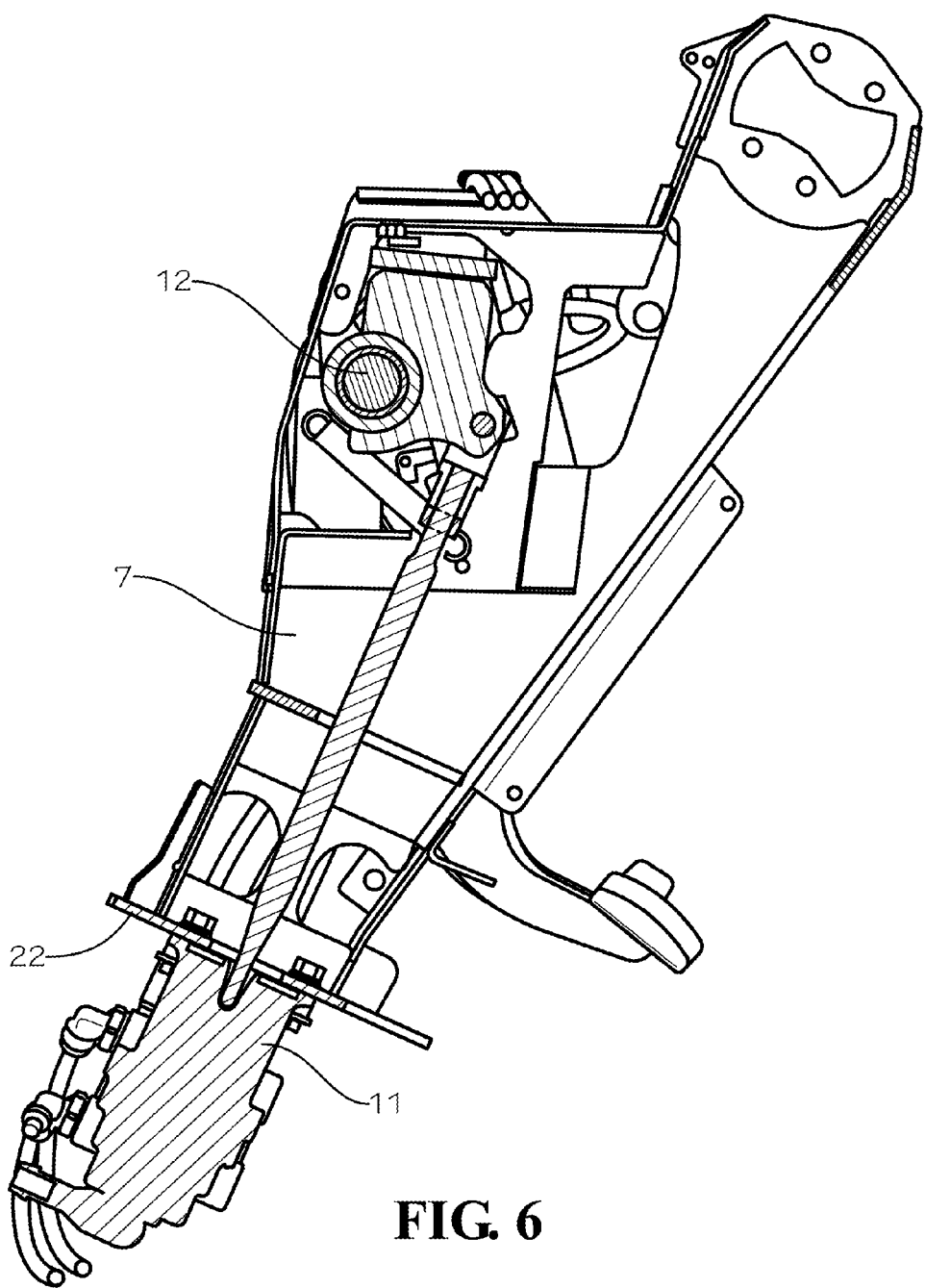
FIG. 6 shows a section on the line D-D of FIG. 5.

To disengage bolt 29 from aperture 30, to allow independent operation of pedals 9 and 10, a peg 31 connected with bolt 29 is displaced to the right as viewed in FIG. 6 to compress spring 32 which biases bolt 29 to the left as viewed in FIG. 5. Peg 31 is moved along slot 33 in to portion 33*a* of slot 33 where the associated bolt 29 is retained in its retracted position out of engagement with aperture 30.

Brake operation sensors 34 and 35 act on the arms 13 and 14 of pedals 9 and 10 to provide signals indicative of the operation of the right and left brakes of the tractor. These signals are used by various control systems of the tractor and can also be used to activate the brake lights of the tractor.

The braking circuits are now explained in detail with reference to FIGS. 7 and 8.

Figure 7:
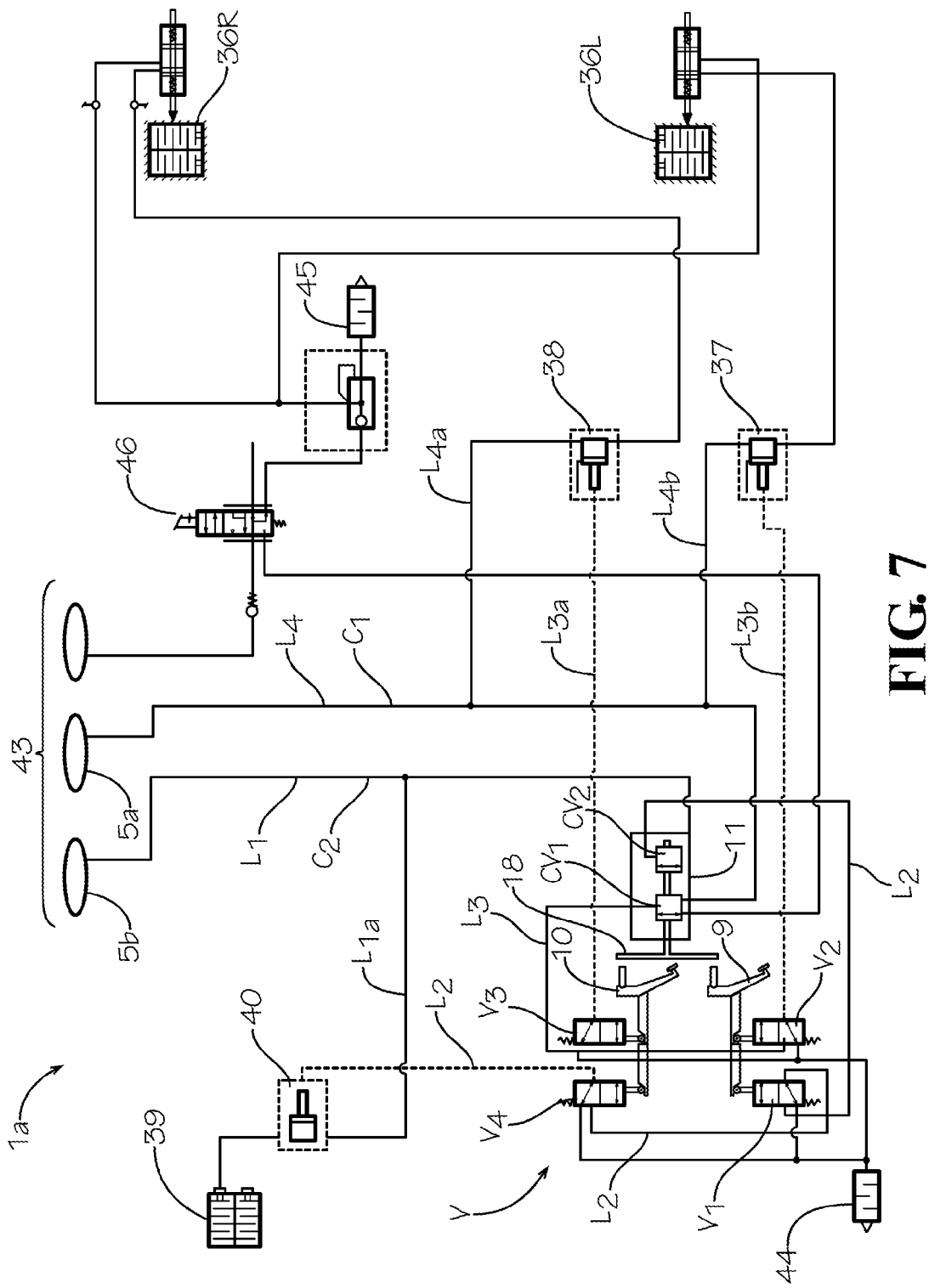
FIG. 7 is a schematic of the brake circuit in accordance with the invention and FIG. 8 is an alternative schematic of the brake circuit in accordance with the invention.

FIG. 7, is a schematic 1*a* of a pneumatically operable brake system for an agricultural tractor having a first brake circuit for activating left and right rear brakes 36L, 36R individually for application to left and right rear wheels respectively (not shown). The numerals referred to in FIGS. 1 to 6 refer to the same features in FIG. 7. Left and right rear brakes 36L, 36R are operable by respective associated left and right brake valves 37, 38. The first brake circuit C1 comprises a first control valve CV1 and supply lines L3, L3*a*, L3*b*, L4, L4*a* and L4*b*.

The system further comprises a second brake circuit to activate cardan brake 39 for application to an output shaft from the transmission. Cardan brake 39 is operable by associated cardan brake valve 40. This second brake circuit C2 comprises control valve CV2 and supply lines L1, L1a and L2.

Each brake circuit C1, C2 is connected to a separate fluid reservoir. The first brake circuit C1 is connected to fluid supply 5a and the second brake circuit C2 is connected to fluid supply 5b. Both fluid supplies 5a, 5b are connected to cylinder 11 by supply lines L4 and L1 respectively.

Associated cardan brake valve 40 and associated left and right brake valves 37, 38 are all relay valves.

The brakes 39, 36L, 36R are activated by the operator by two foot pedals 9, 10. Left foot pedal 9, when pressed opens left valve V2 and a first brake valve V1. Right foot pedal 10 when pressed opens right brake valve V3 and a second brake valve V4. Both pedals will activate the piston of the master cylinder 11 which activate first and second pressure control valves CV1, CV2.

The first control valve CV1 and the second control valve CV2 are each connected to the fluid supply 43 for pneumatically activating the associated brake valves 37, 38, 40.

The brakes 36L, 36R and 39 are connected to a fluid supply 43 which comprises separate fluid supplies 5a, 5b connected to pneumatic cylinder 11. Fluid supply 43 is also connected to associated brake valves 37, 38, 40. When neither pedal 9, nor 10 is pressed the associated brake valves 37, 38, 40 are in a closed position which means that the brakes 36L, 36R and 39 are not activated because the supply of air through lines L1a, L4a and L4b is blocked.

The second control valve CV2 switches the associated cardan brake valve 40 to an open position via first and second brake valves V1, V4 (when both brake valves V1, V4 are open) allowing cardan brake 39 to be activated through supply line L1a. First and second brake valves V1, V4 are arranged in series.

The first control valve CV1 switches either associated left brake valve 37 or associated right brake valve 38 or both of them to an open position via left and/or right valves V2, V3 respectively which then activates either brake 36L or brake 36R or both of them together.

Valves 44 and 45 are de-aeration valves for the arrangement. Valve 46 is used to operate a handbrake on the arrangement and may also be connected to brakes on trailer attached to the tractor. Valves 44, 45, 46 do not form part of the invention and are therefore not described in further detail.

When neither pedal 9, 10 is moved, first and second brake valves V1, V4 and left and right valves V2, V3 are biased to a closed position. When both foot pedals 9, 10 are pressed together, a lever 18 activates first and second control valves CV1, CV2 and at the same time left and right valves V2, V3 and first and second brake valves V1, V4 are opened. Air flows from the fluid supply 43, along line L1, through second control valve CV2, along line L2 through first and second brake valves V1, V4 and through to cardan brake associated valve 40 which switches valve 40 to an open position. Air can then flow from the fluid supply 43 along line L1 and L1a to the brake 39. At the same time, air also flows from the fluid supply 43, along line L4 through first control valve CV1, along line L3 through left and right valves V2, V3 and along lines L3a, L3b through to associated brake valves 37, 38 which switch valves 37, 38 to an open position. Air can then flow from air supply 43 through line L4, through lines L4a and L4b to activate rear brakes 36L, 36R.

If the operator simply wishes to apply one of the rear brakes, for example the left rear brake 36L to help him steer left around a bend, the operator pushes the left foot pedal 9 only. In this instance first brake valve V1 and left valve V2 open but second brake valve V4 and right valve V3 are not activated and therefore remain closed. Control valves CV1, CV2 are both opened by lever 18. Air from the fluid supply 43 passes through line L2 through first brake valve V1 but cannot pass through second brake valve V4 as it is closed. As a result, cardan brake associated valve 40 cannot be activated and thus line L1a cannot carry air to apply the cardan brake 3. Only the left rear brake 36L is applied since although air flows from the supply 43, along line L4 and through control valve CV1, it cannot flow through right valve V3 which controls the air flow to the associated brake valve 38. As a result, right rear brake 36R is not activated and only left rear brake 36L is.

Pedals 9, 10 may be pressed together by joining them with a connector (not shown), so that when one pedal is moved by the operator, the other connected pedal also moves.

Similarly, if only the right foot pedal 10 is pressed, first and second control valves CV1, CV2, second brake valve V4 and right valve V3 open but first brake valve V1 and left valve V2 remain closed. Fluid from the fluid supply 43 passes through control valve CV2 but cannot pass through first brake valve V1 to activate associated cardan brake valve 40 as first brake valve V1 is closed and therefore cardan brake 39 cannot be applied. Only the right rear brake 36R is applied since left valve V2 which controls the air flow to the associated left brake valve 37 is closed and therefore left rear brake 36L is not activated. Air flowing from the air supply 43 therefore flows through control valve CV1 and through right valve V3 to activate associated right brake valve 38. Air can then flow through line L4 and L4a to activate brake 36R.

The first or second brake valve V1, V4 remains closed when only one foot pedal 9, 10 is pressed and the cardan brake associated valve 40 cannot be activated and therefore the cardan brake 39 cannot be accidentally applied.

Figure 8:
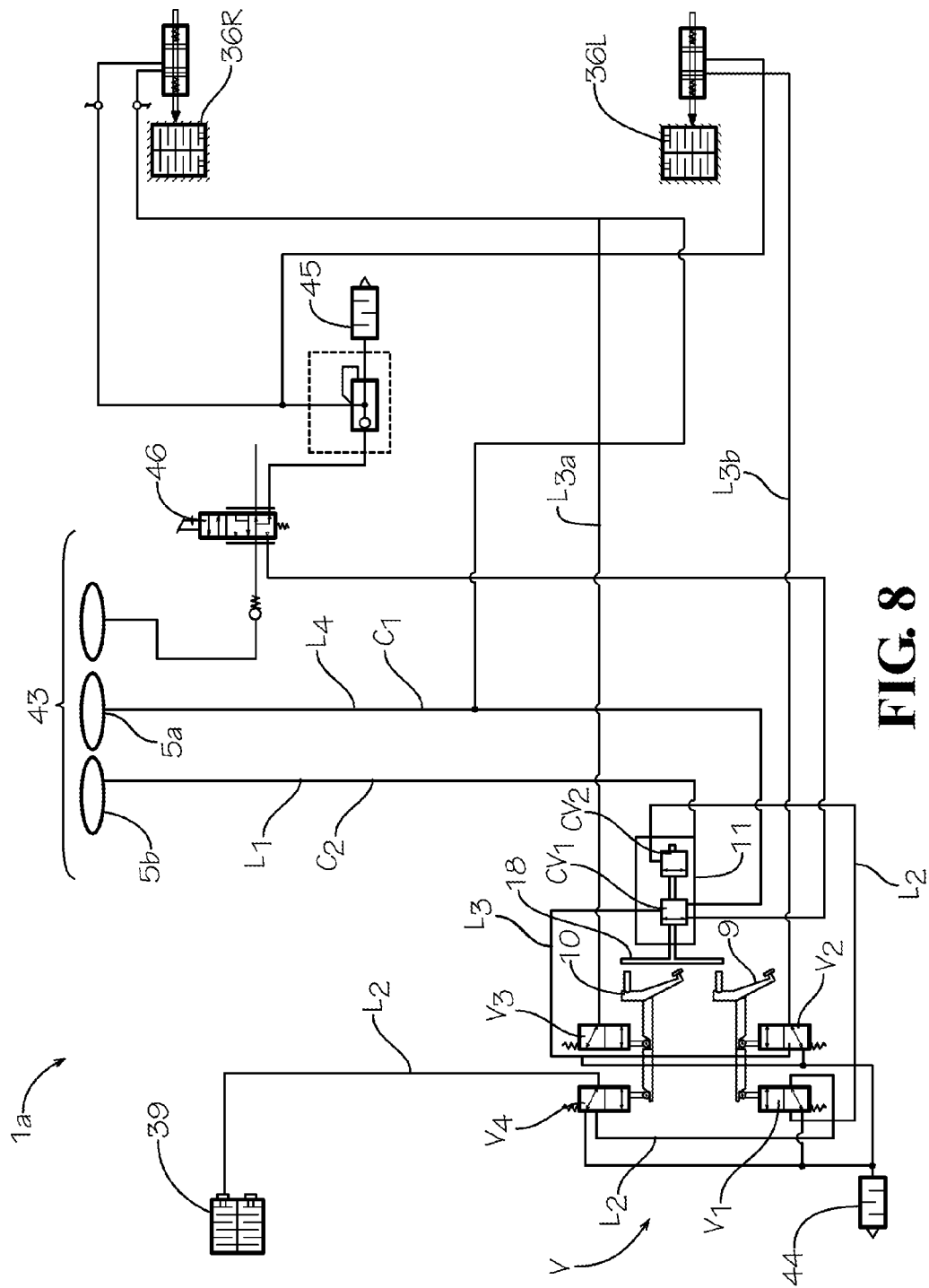

FIG. 8 shows an alternative embodiment of the invention in which the associated cardan brake valve 40 and associated left and right brake valves 37 and 38 are omitted. As a result, activation of the brakes 39, 36L, 36R is controlled via the valve arrangement V. The same features are given the same references as in FIG. 7.

When both foot pedals 9, 10 are pressed together, a lever 18 activates first and second control valves CV1, CV2 and at the same time left and right valves V2, V3 and first and second brake valves V1, V4 are opened. Air flows from the fluid supply 43/5b, along line L1, through second control valve CV2, along line L2 through first and second brake valves V1, V4 and through to cardan brake 39 to activate it. At the same time, air also flows from the fluid supply 43/5a, along line L4 through first control valve CV1, along line L3 through left and right valves V2, V3 and along lines L3a, L3b to activate rear brakes 36L, 36R.

As before, if only one pedal 9 or 10 is moved, only first or second brake valve V1, V4 is opened leaving the other valve V1 or V4 closed. As a result, cardan brake 39 is not connected to the fluid supply 43 and therefore the cardan brake 39 is not activated.

In the embodiment described, the cylinder 11 is a pneumatic cylinder and the all the valves are activated by air pressure. It must be understood that the embodiment could also be operated by a hydraulic cylinder.

The invention claimed is:

1. A brake and steering arrangement on a tractor comprising a substantially vertically extending structural support column 2 for connection at a lower end 3 to a floor 4 of a tractor cab and carrying means to support a steering wheel at its upper end, a single cylinder 11 supported within the column, a first braking circuit C1 for operating left and right rear brakes 36L, 36R and a second braking circuit C2 for operating a cardan brake 39, characterised in that braking circuits C1, C2 are connected to the single cylinder 11 mounted on the steering column in the tractor cab and wherein said steering column comprises a valve unit 5d, so that the brakes 36L, 36R, 39 are operable by two pedals 9, 10.

2. A brake and steering arrangement as claimed in claim 1 wherein the valve unit 5d comprises a first and second brake valve V1, V4 connected in series to the cylinder 11, one of said valves V1, V4 being operable by one pedal 9, 10, and the other of said valves V1, V4 operable by the other pedal 9, 10 and wherein said valves V1, V4 are connected in series with the cardan brake 39.

3. A brake and steering arrangement as claimed in claim 2 wherein the first brake valve V1 and the left brake valve V2 are activated by one pedal 9 and the second brake valve V4 and the right brake valve V3 are activated by the other pedal 10.

4. A brake and steering arrangement as claimed in claim 2 wherein the first and second brake valves V1 and V4 are connected in series with an associated cardan brake valve 40 for controlling fluid supply to the cardan brake 39.

5. A brake and steering arrangement as claimed in claim 1 wherein the valve unit 5d comprises a left brake valve V2 and a right brake valve V3 for activating left and right brakes 36L, 36R respectively in the first circuit, said left brake valve V2 operable by one pedal and said right brake valve V3 operable by the other pedal.

6. A brake and steering arrangement as claimed in claim 5 claim wherein activation of either pedal 9, 10 opens the first brake valve V1 and the left brake valve V2, or the second brake valve V4 and the right brake valve V3 and wherein movement of both pedals 9, 10 together opens the first brake valve V1, the second brake valve V4, the left brake valve V2 and the right brake valve V3.

7. A brake and steering arrangement as claimed in claim 5 wherein the left and right brake valves V2, V3 are connected to associated left and right brake valves 37, 38 respectively for controlling fluid supply to the left and right brakes 36L, 36R respectively.

8. A brake and steering arrangement as claimed in claim 1 wherein the cylinder 11 comprising an operating rod 20, is moved substantially vertically by movement of either pedal 9 or 10 or by movement of both pedals 9, 10 together.

9. A brake and steering arrangement as claimed in claim 1 wherein the cylinder 11 is a pneumatic or a hydraulic cylinder.

10. A brake and steering arrangement as claimed in claim 1 wherein the cylinder 11 is connected to a fluid supply 43.

11. A brake and steering arrangement as claimed in claim 10 wherein the fluid supply 43 comprises two separate fluid supplies, a first fluid supply 5a for the first circuit C1 and a second fluid supply 5b for the second circuit C2.

12. A brake and steering arrangement as claimed in claim 1 wherein the valve unit 5d is connected to a bearing of the steering column by welding.

13. A brake and steering arrangement as claimed in claim 1 wherein the first and second brake valves V1, V4 and the left and right brake valves V2, V3 are connected to the valve unit 5d by hollow screws.

* * * * *